(12) United States Patent
Choi et al.

(10) Patent No.: US 10,804,539 B2
(45) Date of Patent: Oct. 13, 2020

(54) NEGATIVE ELECTRODE FOR LITHIUM-METAL SECONDARY BATTERY AND LITHIUM-METAL SECONDARY BATTERY INCLUDING THE SAME

(71) Applicant: LG CHEM, LTD., Seoul (KR)

(72) Inventors: Hee Won Choi, Daejeon (KR); Sang Wook Woo, Daejeon (KR); Oh Byong Chae, Daejeon (KR); Eun Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 11 days.

(21) Appl. No.: 16/303,039

(22) PCT Filed: Sep. 29, 2017

(86) PCT No.: PCT/KR2017/010983
§ 371 (c)(1),
(2) Date: Nov. 19, 2018

(87) PCT Pub. No.: WO2018/070728
PCT Pub. Date: Apr. 19, 2018

(65) Prior Publication Data
US 2019/0288291 A1    Sep. 19, 2019

(30) Foreign Application Priority Data

Oct. 11, 2016  (KR) .................. 10-2016-0131411
Sep. 28, 2017  (KR) .................. 10-2017-0125952

(51) Int. Cl.
*H01M 4/62*    (2006.01)
*H01M 4/04*    (2006.01)
(Continued)

(52) U.S. Cl.
CPC ......... *H01M 4/628* (2013.01); *H01M 4/0445* (2013.01); *H01M 4/134* (2013.01);
(Continued)

(58) Field of Classification Search
CPC .... H01M 4/628; H01M 4/0445; H01M 4/134; H01M 4/137; H01M 4/1395;
(Continued)

(56) References Cited

U.S. PATENT DOCUMENTS

2005/0095504 A1 *  5/2005  Kim ................... H01M 2/1673
                                                                429/246
2013/0224632 A1    8/2013  Roumi
2019/0097241 A1 *  3/2019  Weber ................ H01M 8/1004

FOREIGN PATENT DOCUMENTS

KR       1999-0055229 A     7/1999
KR    10-2005-0041661 A     5/2005
(Continued)

OTHER PUBLICATIONS

Extended European Search Report for European Application No. 17859518.7, dated Jun. 17, 2019.
(Continued)

*Primary Examiner* — Sarah A. Slifka
*Assistant Examiner* — Patrick Marshall Greene
(74) *Attorney, Agent, or Firm* — Birch, Stewart, Kolasch & Birch, LLP

(57) ABSTRACT

A negative electrode for a lithium-metal secondary battery and a lithium-metal secondary battery including the same are provided which have an excellent life characteristic and have less irregular resin phases formed on the surface the negative electrode. The negative electrode includes a polymer layer arranged in a lattice structure having vacant spaces, so that the specific surface area of the negative electrode can be increased, a uniform current density distribution can thereby be achieved, the negative electrode has excellent life characteristics, and the formation of irregular resin phases can be suppressed.

10 Claims, 2 Drawing Sheets

(51) Int. Cl.
  *H01M 4/134* (2010.01)
  *H01M 4/1395* (2010.01)
  *H01M 4/36* (2006.01)
  *H01M 4/38* (2006.01)
  *H01M 10/052* (2010.01)
  *H01M 10/42* (2006.01)
  *H01M 4/1399* (2010.01)
  *H01M 4/137* (2010.01)
  *H01M 4/02* (2006.01)
  *H01M 10/04* (2006.01)

(52) U.S. Cl.
  CPC ......... *H01M 4/137* (2013.01); *H01M 4/1395* (2013.01); *H01M 4/1399* (2013.01); *H01M 4/366* (2013.01); *H01M 4/382* (2013.01); *H01M 10/052* (2013.01); *H01M 10/4235* (2013.01); *H01M 10/0427* (2013.01); *H01M 10/42* (2013.01); *H01M 2004/027* (2013.01); *H01M 2004/028* (2013.01)

(58) Field of Classification Search
  CPC .... H01M 4/1399; H01M 4/366; H01M 4/382; H01M 10/052; H01M 10/4235; H01M 10/0427; H01M 10/42; H01M 2004/027; H01M 2004/028
  See application file for complete search history.

(56) References Cited

FOREIGN PATENT DOCUMENTS

| | | |
|---|---|---|
| KR | 10-0582558 B1 | 5/2006 |
| KR | 100582558 B1 * | 5/2006 |
| KR | 10-2013-0067920 A | 6/2012 |
| KR | 10-2014-0058928 A | 5/2014 |
| KR | 10-1503807 B1 | 3/2015 |
| WO | WO 2018/062883 A2 | 4/2018 |

OTHER PUBLICATIONS

International Search Report (PCT/ISA/210) issued in PCT/KR2017/010983, dated Jan. 15, 2018.

* cited by examiner (a)  (b)

(a)  (b)

NEGATIVE ELECTRODE FOR LITHIUM-METAL SECONDARY BATTERY AND LITHIUM-METAL SECONDARY BATTERY INCLUDING THE SAME

CROSS-REFERENCE TO RELATED APPLICATIONS

This application claims the benefit of Korean Patent Application No. 10-2016-0131411, filed on Oct. 11, 2016, and Korean Patent Application No. 10-2017-0125952, filed on Sep. 28, 2017, in the Korean Intellectual Property Office, the disclosure of which is incorporated herein in its entirety by reference.

TECHNICAL FIELD

The present invention relates to a negative electrode for a lithium-metal secondary battery which has an excellent life characteristic and less irregular resin phases formed on the surface thereof, and to a lithium-metal secondary battery including the same.

BACKGROUND ART

As the technological development and demand for mobile devices have increased, the demand for secondary batteries as an energy source is rapidly increasing, and among such secondary batteries, a lithium secondary battery having high energy density and voltage, and a low self discharge rate has been commercialized.

Lithium-metal secondary batteries are the first commercialized lithium secondary batteries in which a lithium metal is used as a negative electrode. However, the lithium-metal secondary battery had problems of cell expansion and gradual decrease in capacity and energy density due to a lithium resin phase formed on the surface of the lithium-metal negative electrode, short caused by continuous growth of the resin phase, decrease in cycle life, and cell stability (explosion and firing), and therefore, the production thereof was stopped just several years after being commercialized. Accordingly, instead of the lithium metal, a carbon-based negative electrode which is safer and can safely store lithium in a lattice or vacant space in an ion state was used, and due to the use of the carbon-based negative electrode, full-scale commercialization and propagation of lithium secondary batteries have progressed.

So far, the main stream of the lithium secondary batteries have been carbon-based or non-carbon-based negative electrode materials, and most development of negative electrode materials have been concentrated on carbon-based materials (such as graphite, hard carbon, soft carbon) and non-carbon-based materials (such as silicon, tin, titanium oxides). However, the carbon-based materials have theoretical capacity of 400 mAh/g or less, and the non-carbon-based materials have the theoretical capacity of greater than 1000 mAh/g, but have problems of volume expansion during charging/discharging and performance degradation.

Meanwhile, recently, while medium and large-size lithium secondary batteries have been wide spread, high capacity and high energy density are being demanded, but existing carbon-based or non-carbon-based negative electrode materials have limits in satisfying such performance.

Accordingly, recently, research for reusing lithium metal such as a lithium-air battery is being actively carried out, and interests in lithium-metal secondary batteries are being rising high again. Lithium is very light and has possibility of achieving excellent energy density so as to have theoretical capacity exceeding 3800 mAh/g.

However, to apply the lithium metal as a negative electrode material of a secondary electrode, there are a pile of problems to overcome First, unlike a graphite-based negative electrode material, in a lithium-metal negative electrode, ion-type lithium escaped from a positive electrode is changed into neutral lithium through an electrochemical reaction with electrons transferred from an external conductive wire, and therefore, during charging, a very irregular lithium aggregate is easily formed on the surface of lithium in a shape of a resin phase. The irregular surface formed as such provides a wholly expanded volume, ions are not selectively separated from the lithium resin phase during discharging, but are more likely to be directly dissociated from lithium metal. Therefore, while undergoing a series of charging/discharging, the surface of the lithium-metal negative electrode not only experiences extreme volume change but also has a resin phase which is formed thereon and exhibits an irregular and complicated morphology. Such a complicated state of the surface cannot be stabilized at all while cycles progress and continuously repeats generation and extinction, and thereby exhibits a very irregular cycle life. In addition, a lithium resin phase formed during discharging is entirely transferred to a region of electrolyte while being dissociated, or the resin phase continuously grows, penetrates a separation membrane, and directly or indirectly contacts the surface of a positive electrode positioned on the opposite side, thereby also causes a short circuit.

Thus, to commercialize a lithium-metal secondary battery, a method which can improve the charging/discharging characteristics and life characteristics is demanded.

DISCLOSURE OF THE INVENTION

Technical Problem

The present invention has been devised to solve the aforementioned limitations of conventional arts, and the purpose of the present invention is to provide a negative electrode for lithium-metal secondary battery, the negative electrode having a wide specific surface area and achieving a uniform current density, thereby having an excellent life characteristics and a little formation of irregular resin phase on the surface thereof.

Another purpose of the present invention is to provide a lithium-metal secondary battery having excellent charging/discharging capacity characteristics by including the electrode.

Technical Solution

According to an aspect of the present invention, there is provided a negative electrode for a lithium-metal secondary battery, the negative electrode including a collector and a polymer layer formed on at least one surface of the collector, wherein the polymer layer is arranged in a lattice structure having vacant spaces, and the vacant spaces are filled with lithium.

According to another aspect of the present invention, there is provided a method for manufacturing a negative electrode for a lithium-metal secondary battery, the method including: filling a polymer layer formed in a lattice structure with lithium (step 1); and forming the polymer layer filled with lithium on at least one surface of a collector.

According to another aspect of the present invention, there is provided a lithium-metal secondary battery including the negative electrode, a positive electrode, and a separation membrane disposed between the negative electrode and the positive electrode, and an electrolyte.

Advantageous Effects

A negative electrode according to the present invention includes a polymer layer arranged in a lattice structure having vacant spaces, so that the specific surface area of the negative electrode can be increased, a uniform current density can thereby be achieved, excellent life characteristics can be obtained, and the formation of an irregular resin phase can be suppressed.

In addition, a lithium-metal secondary battery according to the present invention includes the negative electrode, so that the charging/discharging efficiency thereof can be increased due to lithium filled in the vacant spaces of the polymer layer, and the life characteristics thereof can thereby be improved.

Accordingly, the negative electrode and the lithium-metal secondary battery including the same according to the present invention can be usefully applied to the battery industry.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a negative electrode for a lithium-metal secondary battery, the negative electrode enabling a uniform current density distribution and improvement of charging/discharging efficiency and life characteristics of a lithium-metal secondary battery including the negative electrode.

A negative electrode for a lithium-metal secondary battery according to an embodiment of the present invention is characterized by including a collector; and a polymer layer formed on at least one surface of the collector, wherein the polymer layer is arranged in a lattice structure having vacant spaces, and the vacant spaces are filled with lithium.

Hereinafter with reference to FIG. 1, the negative electrode according to an embodiment of the present invention will be described in detail.

Figure 1:
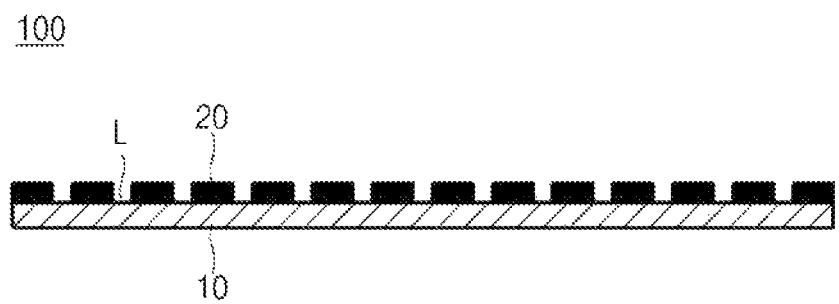
FIG. 1 schematically illustrates a structure of a negative electrode 100 according to an embodiment of the present invention, (a) of FIG. 1 schematically illustrates one cross-section of the negative electrode 100 (a lithium filled state), and (b) of FIG. 1 schematically illustrates (does not illustrates that lithium is filled in vacant spaces) a plan view of the negative electrode 100.
Figure 1:
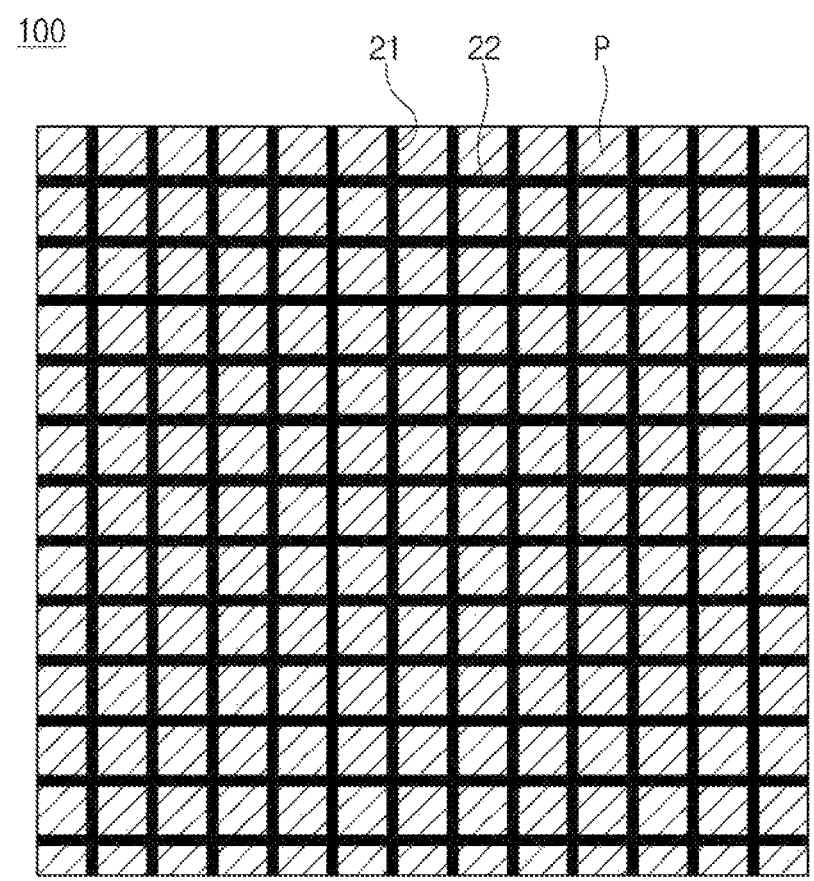

FIG. 1 schematically illustrates a structure of a negative electrode according to an embodiment of the present invention, (a) of FIG. 1 schematically illustrates one cross-section of the negative electrode 100 (a lithium filled state), and (b) of FIG. 1 schematically illustrates a plan view of the negative electrode.

As illustrated in FIG. 1, a negative electrode 100 according to an embodiment of the present invention includes a collector 10; and a polymer layer 20, wherein the polymer layer 20 is arranged in a lattice structure 21 and 22 having vacant spaces P, and the vacant spaces P are filled with lithium L.

The collector 10 may be, but not particularly limited, any collector, provided that the collector does not cause a chemical change in the battery and has high conductivity. For example, the collector may be copper, stainless steel, aluminum, nickel, titanium, calcined carbon, or aluminum or stainless steel with a surface treated with carbon, nickel, titanium, silver, or the like. Specifically, the collector 10 may be copper.

In addition, the collector 10 may generally have a thickness of 3 µm to 500 µm.

The polymer layer 20 may be positioned on at least one surface of the collector 10 and formed in a lattice structure, for example, a mesh structure.

Specifically, the polymer layer 20 may be formed by being arranged in a lattice structure as described above, and the lattice structure may be disposed with vacant spaces therein.

At this point, the lattice structure may be disposed at regular intervals, and thus, the vacant spaces P in the polymer layer 20 may have a certain size.

The vacant spaces P may occupy an area of 40% to 60% with respect to the total area of the polymer layer 20, specifically, an area of 50%.

That is, the open area of the polymer layer 20 may be 40% to 60%.

A negative electrode according to an embodiment of the present invention include a polymer layer having a mesh structure and the aforementioned vacant spaces, so that the specific area of the negative electrode may increase, the current density thereof may be uniform, and thus when a lithium-metal secondary battery including the negative electrode is charged, lithium ions moved from a positive electrode may be easily charged. In addition, the polymer layer may serve as a protective layer to thereby prevent a direct contact with an electrolyte.

In addition, a negative electrode 100 according to an embodiment of the present invention, as described above, may have the vacant spaces P filled with lithium, and specifically, the Lithium L may fill the vacant spaces P so as to cover an area of 5% to 20% with respect to the total area of the vacant spaces P. Specifically, the Lithium may fill the vacant spaces P so as to cover an area of 5% to 10%. When the lithium L fills the above-mentioned range, the electrochemical charge/discharge reversibility may be improved even without remarkably reduce the porosity and the specific area of the polymer layer.

At this point, the lithium L may fill the vacant spaces P through a manufacturing method to be described later, and the lithium L may be attached to the polymer layer while being positioned in the vacant spaces P between the lattice structures.

Meanwhile, the polymer layer 20 may have a thickness of 10 μm to 100 μm.

Specifically, the polymer layer 20 may have a thickness of 20 μm to 50 μm.

In addition, the polymer layer may be formed of nylon, and the lattice width of the lattice structure may be 1 μm to 10 μm. Specifically, the lattice width of the lattice structure may be 2 μm to 5 μm. When the lattice width of the lattice structure exceeds the above-mentioned range, the size of the vacant spaces P formed by the lattice structure may be too large or small, and consequently, a problem may be caused such that lithium ions cannot smoothly move when a lithium-metal secondary battery in which a negative electrode including the lattice structure is applied is charged/discharged.

In addition, the present invention provides a method for manufacturing a negative electrode for a lithium-metal secondary battery.

A method for manufacturing a negative electrode for a lithium-metal secondary battery according to an embodiment of the present invention is characterized by including the steps of: filling a polymer layer formed in a lattice structure with lithium (step 1); and forming the polymer layer filled with lithium on at least one surface of a collector.

Step 1 is a step for manufacturing a polymer layer filled with lithium and may be a step performed by applying current after a coin-type half cell is manufactured by using a lithium source that provides lithium and a polymer.

Specifically, step 1 is performed by applying current of 0.5 mA to 1 mA after a coin-type half cell is manufactured by interposing a separation membrane and an electrolyte between a lithium thin film and the polymer with the lithium thin film serving as a positive electrode and the polymer serving as a negative electrode. At this point, lithium may be moved from the lithium thin film to the polymer and fill vacant spaces between the lattice structures in the polymer.

Here, the polymer may be used by being manufactured so as to have desired vacant space by arranging nylon wires in lattice structures, or a commercialized nylon mesh (nylon net.) may be bought and used.

Step 2 is a step for manufacturing a negative electrode for a lithium-metal secondary battery including a polymer layer formed in a lattice structure, and may be performed by positioning and attaching the polymer layer filled with lithium on at least one surface of the collector.

In addition, the present invention provides a lithium-metal secondary battery including the above-mentioned negative electrode.

The lithium-metal secondary battery according to an embodiment of the present invention is characterized by including the negative electrode, a positive electrode, and a separation membrane disposed between the positive electrode and the negative electrode; and an electrolyte.

The positive electrode may be, but not particularly limited to, a lithium thin film or a positive electrode active material layer formed on the one surface of the collector. When the positive electrode is the positive electrode active material layer formed on the one surface of the collector, the positive electrode may be manufacture by applying positive electrode active material slurry including a positive electrode active material on the one surface of the collector, and drying. At this point, the slurry may further include, in addition to the positive active material, additives such as a binder, a conductor, a filler, and a dispersant.

The positive electrode active material may be, but not limited to, for example, a manganese-based spinel active material, a lithium-metal oxide, or a mixture thereof, and the lithium-metal oxide may be a lithium-manganese-based oxide, a lithium-nickel-manganese-based oxide, a lithium-manganese-cobalt-based oxide, a lithium-nickel-manganese-cobalt-based oxide, or the like. Specifically, the positive electrode active material may be $LiCoO_2$, $LiNiO_2$, $LiMnO_2$, $LiMn_2O_4$, $Li(Ni_aCo_bMn_c)O_2$ (where, $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (where, $0\leq y<1$), $Li(Ni_aCo_eMn_f)O_4$ (where, $0<d<2$, $0<e<2$, $0<f<2$, $d+e+f=2$), $LiMn_{2-z}Ni_zO_4$, or $LiMn_{2-z}Co_2O_4$ (where, $0<z<2$).

The binder is a component assisting the bonds between the positive electrode active material, a conductor, and a collector, and in general, the binder may be added in an amount of 1 wt % to 30 wt % based on the total amount of the positive electrode active material. Such a binder may be, but not particularly limited to, for example, one selected from the group consisting of vinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxy propyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene-butylene rubber (SBR), fluoro rubber, or a mixture of two or more thereof.

The conductor may be, but not limited to, for example, graphite such as natural graphite or artificial graphite; carbon black such as a carbon black (super-p), acetylene black, Ketjen black, channel black, furnace black, lamp black, and thermal black; conductive fibers such as carbon fibers and metallic fibers; metal powder such as carbon fluoride powder, aluminum powder and nickel powder; conductive whiskers such as zinc oxide and potassium titanate; conductive metal oxides such as titanium oxide; conductive materials such as polyphenylene derivatives, or the like. The conductor may be generally added in an amount of 0.05 wt % to 5 wt % based on the total weight of the positive electrode active material slurry.

The filler is a component that suppresses the expansion of the positive electrode, whether to use the filler may be determined according to a need, and the filler may be, but not particularly limited to, for example, an olefin-based polymer such as polyethylene and polypropylene; and fibrous materials such as glass fibers and carbon fibers, as long as it does not cause a chemical change to the battery and is fibrous materials.

The dispersant (dispersing liquid) may be, but not limited to, for example, isopropyl alcohol, N-methylpyrrolidone (NMP), acetone, or the like.

The applying of the positive electrode active material slurry may be performed through a generally known method in the art, but may be performed by distributing the positive electrode active material slurry on one-side upper surface of the positive electrode collector and then uniformly dispersing the positive electrode active material slurry by using a doctor blade or the like. Additionally, the applying may be performed through a method such as die casting, comma coating, or screen printing.

The drying may be, but not particularly limited to be, performed in a vacuum oven of 50° C. to 200° C. within one day.

The separation membrane may be an insulating thin film having high ion permeability and mechanical strength, and generally have a pore diameter of 0.01 μm to 10 μm and a thickness of 5 μm to 300 μm. As such a separation membrane, a porous polymer film, for example, a porous polymer film manufactured by using a polyolefin-based polymer, such as an ethylene single polymer, a propylene single polymer, an ethylene-butane copolymer, an ethylene-hexene copolymer, an ethylene-methacrylate copolymer may be sorely used or a laminate thereof may be used. In addition, a general porous nonwoven fabric, for example, a fabric of a high-melting-point glass, polyethylene terephthalate fibers, or the like may be used, but the present invention is not limited thereto.

The electrolyte may be, but not particularly limited to, an electrolyte containing a generally used organic solvent and a lithium salt.

Negative ions of the lithium salt may be one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $(CF_3SO_2)_2N^-$, $(FSO_2)_2N^-$, $CF_3CF_2(CF_3)_2CO^-$, $(CF_3CO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent may be one or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfide, and tetrahydrofuran.

In particular, among the carbonate-based organic solvent, it may be desirable to use the ethylene carbonate and the propylene carbonate, which are cyclic carbonates, because the ethylene carbonate and the propylene carbonate are high viscosity organic solvents, have high dielectric constants, and thus easily dissociate a lithium salt in the electrolyte. In addition, when a linear carbonate having low viscosity and dielectric constant such as dimethyl carbonate and diethyl carbonate is used by being added to such a cyclic carbonate with an appropriate ratio, an electrolyte having a high electrical conductivity may be prepared, and thus may be more favorably used.

Further, if necessary, in order to improve charge/discharge characteristics and flame retardancy or the like, the electrolyte may further include pyridine, triethyl phosphate, triethanolamine, cyclic ether, ethylenediamine, n-glyme, hexaphosphoric triamide, a nitrobenzene derivative, sulfur, quinone-imine dye, N-substituted oxazolidinone, N,N-substituted imidazolidine, ethylene glycol dialkyl ether, an ammonium salt, pyrrole, 2-methoxyethanol, and aluminum trichloride, or the like. According to cases, in order to impart incombustibility, a halogen-containing solvent such as carbon tetrachloride or trifluoride ethylene may further be included, and in order to improve a high-temperature conservation characteristic, carbon dioxide gas may also further be included, and fluoro-ethylene carbonate (FEC), propene sultone (PRS), fluoro-propylene carbonate (FPC), or the like may further be included.

A lithium-metal secondary battery of the present invention may be manufactured such that an electrode assembly is formed by disposing a separation membrane between a positive electrode and a negative electrode, the electrode assembly is incorporated into a cylindrical battery case or a square battery case, and then, an electrolyte is injected thereinto. Alternatively, the lithium-metal secondary battery of the present invention may also be manufactured such that after the electrode assembly is laminated, the resultant obtained by impregnating the laminated electrode assembly into the electrolyte is incorporated into the battery case and sealed.

The battery case generally used in the art may be adopted, has an outer shape without a limitation according to the use of a battery, and the shape may be, for example, a cylindrical shape using a can, a square shape, a pouch shape, a coin shape, or the like.

A lithium-metal secondary battery of the present invention may not only be used for a battery cell used as a power source of a small-size device, but also favorably be used as a unit cell in a medium-and-large size battery module including a plurality of battery cells. Preferred examples of the medium-and-large size devices may be, but not limited to, electric vehicles, hybrid electric vehicles, plug-in hybrid electric vehicles, power storage systems, or the like.

Hereinafter an exemplary embodiment will be described in detail to specifically describe the present invention. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Example 1

1) Manufacturing of Negative Electrode

While a lithium thin film having a thickness of 150 μm served as a positive electrode and a nylon mesh served as a negative electrode, a polyolefin separation membrane was interposed between the lithium thin film and a polymer, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50. Subsequently, a current of 0.5 mA was applied to the cell to manufacture a lithium filled nylon mesh. At this point, in the nylon mesh in which nylon wires were formed in a lattice-structured array having vacant spaces, the vacant spaces occupied 50% of the total area of the nylon mesh, the nylon mesh had a thickness of 50 μm, and the width of the lattice was 5 μm. In addition, lithium was filled in an area of 10% with respect to the total area of the vacant spaces in the nylon mesh.

A negative electrode was manufactured by attaching the manufactured lithium-filled nylon mesh on a copper thin film having a thickness of 20 μm.

2) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Example 2

1) Manufacturing of Negative Electrode

While a lithium thin film having a thickness of 150 μm served as a positive electrode and a nylon mesh served as a negative electrode, a polyolefin separation membrane was interposed between the lithium thin film and a polymer, and then, a coin-type half cell was manufactured by injecting an electrolyte in which 1M of $LiPF_6$ was dissolved a solvent in which ethylene carbonate and ethylmethyl carbonate were mixed with a volume ratio of 50:50. Subsequently, a current of 0.5 mA was applied to the cell to manufacture a lithium-filled nylon mesh. At this point, in the nylon mesh in which nylon wires were formed in a lattice-structured array having vacant spaces, the vacant spaces occupied 50% of the total area of the nylon mesh, the nylon mesh had a thickness of 50 μm, and the width of the lattice was 2 μm. In addition, lithium was filled in an area of 10% with respect to the total area of the vacant spaces in the nylon mesh.

A negative electrode was manufactured by attaching the manufactured lithium-filled nylon mesh on a copper thin film having a thickness of 20 μm.

2) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Example 3

1) Manufacturing of Negative Electrode

While a lithium thin film having a thickness of 150 μm served as a positive electrode and a nylon mesh served as a negative electrode, a polyolefin separation membrane was interposed between the lithium thin film and a polymer, and then, a coin-type half cell was manufactured by injecting an electrolyte in which 1M of $LiPF_6$ was dissolved a solvent in which ethylene carbonate and ethylmethyl carbonate were mixed with a volume ratio of 50:50. Subsequently, a current of 0.5 mA was applied to the cell to manufacture a lithium-filled nylon mesh. At this point, in the nylon mesh in which nylon wires were formed in a lattice-structured array having vacant spaces, the vacant spaces occupied 50% of the total area of the nylon mesh, the nylon mesh had a thickness of 50 μm, and the width of the lattice was 5 μm. In addition, lithium was filled in an area of 5% with respect to the total area of the vacant spaces in the nylon mesh.

A negative electrode was manufactured by attaching the manufactured lithium-filled nylon mesh on a copper thin film having a thickness of 20 μm.

2) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Example 4

1) Manufacturing of Negative Electrode

While a lithium thin film having a thickness of 150 μm served as a positive electrode and a nylon mesh served as a negative electrode, a polyolefin separation membrane was interposed between the lithium thin film and a polymer, and then, a coin-type half cell was manufactured by injecting an electrolyte in which 1M of $LiPF_6$ was dissolved a solvent in which ethylene carbonate and ethylmethyl carbonate were mixed with a volume ratio of 50:50. Subsequently, a current of 0.5 mA was applied to the cell to manufacture a lithium-filled nylon mesh. At this point, in the nylon mesh in which nylon wires were formed in a lattice-structured array having vacant spaces, the vacant spaces occupied 50% of the total area of the nylon mesh, the nylon mesh had a thickness of 50 μm, and the width of the lattice was 5 μm. In addition, lithium was filled in an area of 25% with respect to the total area of the vacant spaces in the nylon mesh.

A negative electrode was manufactured by attaching the manufactured lithium-filled nylon mesh on a copper thin film having a thickness of 20 μm.

2) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Example 5

1) Manufacturing of Negative Electrode

While a lithium thin film having a thickness of 150 μm served as a positive electrode and a nylon mesh served as a negative electrode, a polyolefin separation membrane was interposed between the lithium thin film and a polymer, and then, a coin-type half cell was manufactured by injecting an electrolyte in which 1M of $LiPF_6$ was dissolved a solvent in which ethylene carbonate and ethylmethyl carbonate were mixed with a volume ratio of 50:50. Subsequently, a current of 0.5 mA was applied to the cell to manufacture a lithium-filled nylon mesh. At this point, in the nylon mesh in which nylon wires were formed in a lattice-structured array having vacant spaces, the vacant spaces occupied 50% of the total area of the nylon mesh, the nylon mesh had a thickness of 50 μm, and the width of the lattice was 5 μm. In addition, lithium was filled in an area of 3% with respect to the total area of the vacant spaces in the nylon mesh.

A negative electrode was manufactured by attaching the manufactured lithium-filled nylon mesh on a copper thin film having a thickness of 20 μm.

2) Manufacturing of Lithium-Metal Secondary Battery

The manufactured negative electrode was used as a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Comparative Example 1

A copper thin film having a thickness of 20 μm was used as a negative electrode which was a working electrode, and a lithium thin film with a thickness of 150 μm was used as a positive electrode which was a counter electrode. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Comparative Example 2

A collector on which nylon layer was formed on a copper thin film having a thickness of 20 μm was used as a negative electrode which was a working electrode, and a lithium thin film with a thickness of 150 μm was used as a positive electrode which was a counter electrode.
At this point, the nylon layer was used a nylon mesh in which nylon wires were formed in a lattice-structured array having vacant spaces, the vacant spaces occupied 50% of the total area of the nylon mesh, the nylon mesh had a thickness of 50 μm, and the width of the lattice was 5 μm.
A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Comparative Example 3

A collector on which a nylon layer was formed on a copper thin film having a thickness of 20 μm was used as a negative electrode which was a working electrode, and a lithium thin film with a thickness of 150 μm was used as a positive electrode which was a counter electrode.
At this point, the nylon layer was used a nylon mesh in which nylon wires were formed in a lattice-structured array having vacant spaces, the vacant spaces occupied 50% of the total area of the nylon mesh, the nylon mesh had a thickness of 50 μm, and the width of the lattice was 5 μm. A polyolefin separation membrane was interposed between the negative electrode and the positive electrode, and then, a coin-type half cell was manufactured by injecting an electrolyte in which 1 M of $LiPF_6$ was dissolved a solvent in which ethylene carbonate and ethylmethyl carbonate were mixed with a volume ratio of 50:50.

Experimental Example 1

Each of the cells manufactured in Examples 1 and 2, and Comparative examples 1 to 3 was charged/discharged by using an electrochemical charger/discharger, and then charge/discharge characteristics thereof was measured.
The results are shown in Tables 1 and 2, Table 1 shows the resulting values obtained by charging each battery with 1 $mA/cm^2$, and Table 2 shows the resulting values obtained by charging each battery with 2 $mA/cm^2$.
Specifically, each cell was charged for 1 hour to 2 hours with 1 $mA/cm^2$ or 2 $mA/cm^2$ and was discharged until a voltage reached 1 V vs. Li/Li$^+$. That is, a value of discharging capacity and a value of charging/discharging efficiency were measured by fixing a charging capacity at a certain amount and applying a voltage cut-off to a discharge.

TABLE 1

| Division | Initial charging capacity (mAh) | 50-cycle discharging capacity (mAh) | 50-cycle charging/discharging capacity keeping ratio (%) |
| --- | --- | --- | --- |
| Example 1 | 3.99 | 3.82 | 95.74 |
| Example 2 | 4.00 | 3.78 | 94.50 |
| Example 3 | 3.98 | 3.80 | 95.50 |
| Example 4 | 4.00 | 1.25 | 31.25 |
| Example 5 | 3.96 | 1.36 | 34.3 |
| Comparative example 1 | 3.97 | 0.78 | 19.65 |
| Comparative example 2 | 4.03 | 0.96 | 23.82 |
| Comparative example 3 | 4.02 | 0.68 | 16.92 |

TABLE 2

| Division | Initial charging capacity (mAh) | 50-cycle discharging capacity (mAh) | 50-cycle charging/discharging capacity keeping ratio (%) |
| --- | --- | --- | --- |
| Example 1 | 3.99 | 3.24 | 81.20 |
| Example 2 | 4.00 | 3.15 | 78.75 |
| Example 3 | 3.98 | 3.18 | 79.90 |
| Example 4 | 4.00 | 1.06 | 26.50 |
| Example 5 | 9.36 | 1.07 | 27.00 |
| Comparative example 1 | 3.97 | 0.15 | 3.78 |
| Comparative example 2 | 4.03 | 0.47 | 11.66 |
| Comparative example 3 | 4.02 | 0.32 | 7.96 |

As shown in Tables 1 and 2, it was assured that under both two charging conditions, the cells of Examples 1 to 5 had remarkably smaller decreasing rate of charging/discharging capacity than the cells of Comparative examples 1 to 3 and thus had excellent life characteristics.
Meanwhile, it was assured that the cells of Examples 1 to 3 in which lithium filled 5% to 20% of the total area of the vacant spaces in the polymer layer had remarkably improved life characteristics than the cells of Examples 4 and 5 in which lithium is filled in the vacant spaces to respectively cover 25% and 3% of the total area of the vacant spaces in the polymer layer. Thus, it was assured that more remarkable effect could be achieved by filling the vacant spaces in the polymer layer with lithium at a specific ratio.

Experimental Example 2

Figure 2:
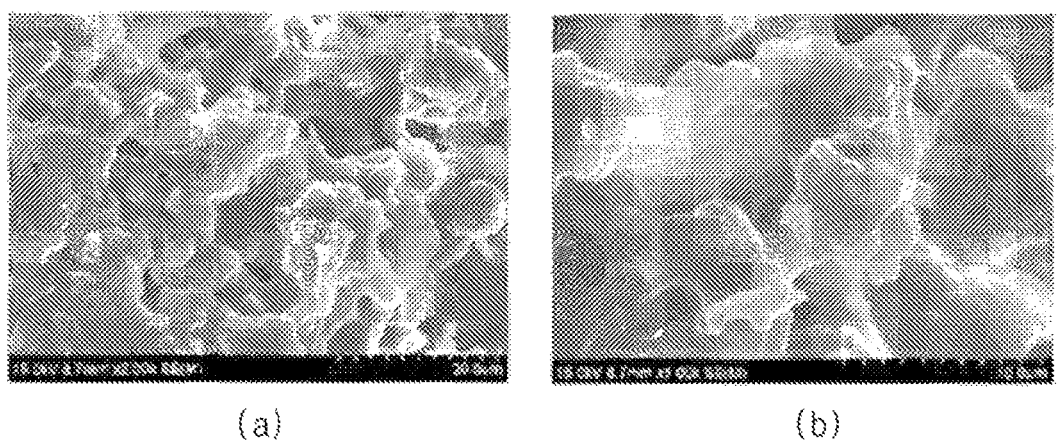
FIG. 2 is an SEM image in which a shape of a resin phase formed on the negative electrode was observed after charging/discharging a coin-type half cell of example 1 according to an embodiment of the present invention, and (a) of FIG. 2 was measured at a magnification of ×2,000, and (b) of FIG. 2 was measured at magnification ×5,000.
Figure 3:
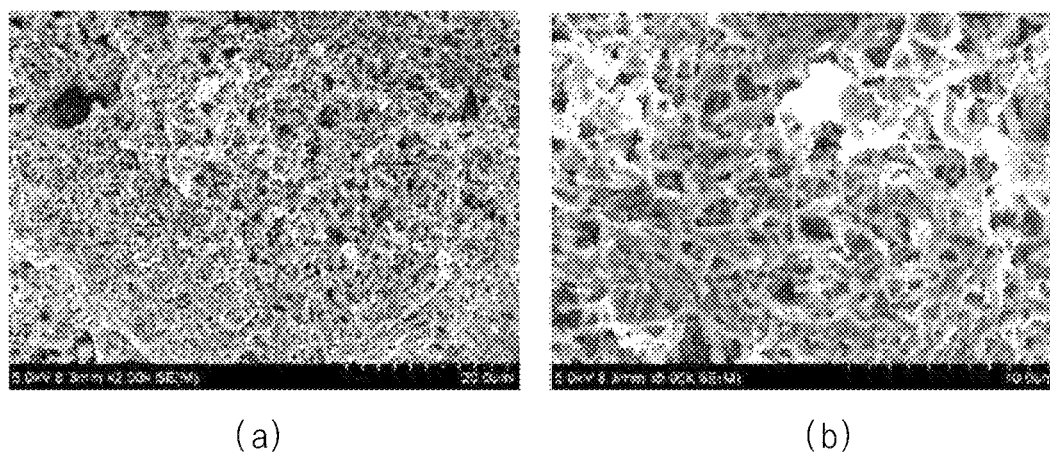
FIG. 3 is an SEM image in which a shape of a resin phase formed on the negative electrode is observed after charging/discharging a coin-type half cell of comparative example 3 according to an embodiment of the present invention, and (a) of FIG. 3 was measured at a magnification of ×2,000, and (b) of FIG. 3 was measured at magnification ×5,000.

After each of the cells manufactured in Examples 1 and Comparative example 3 was charged/discharged, the cells were disassembled, and the surface of the negative electrode was measured through SEM to observe the state of resin phase formation, and the results are shown in FIGS. 2 and 3.
As illustrated in FIGS. 2 and 3, while in the case of the negative electrode of Comparative example 3, sharp and thread-like resin phases were wholly formed, sharp and thread-like resin phases were not observed on the negative electrode of Example 1 compared to Comparative example 3.

The invention claimed is:

1. A negative electrode for a lithium-metal secondary battery, the negative electrode comprising:
   a collector; and
   a polymer layer formed on at least one surface of the collector,
   wherein the polymer layer is arranged in a lattice structure having vacant spaces, and the vacant spaces are filled with lithium, and
   wherein the lithium is filled in the vacant spaces so as to cover 5% to 20% of a surface area of the collector in each vacant space based on a total area of each vacant space in the polymer layer.

2. The negative electrode of claim 1, wherein the vacant spaces occupy an area of 40% to 60% with respect to a total area of the polymer layer.

3. The negative electrode of claim 1, wherein the lithium is filled in the vacant spaces so as to cover 5% to 10% of a surface area of the collector in each vacant space based on a total area of each vacant space in the polymer layer.

4. The negative electrode of claim 1, wherein the polymer layer is formed of nylon.

5. The negative electrode of claim 1, wherein the polymer layer has a thickness of 10 µm to 100 µm.

6. The negative electrode of claim 1, wherein a width of the vacant spaces in the lattice structure is 1 µm to 10 µm.

7. A method of manufacturing a negative electrode for a lithium-metal secondary battery of claim 1, the method comprising the steps of:
   1) filling a polymer layer formed in a lattice structure with lithium; and
   2) forming the polymer layer filled with the lithium on at least one surface of a collector.

8. The method of claim 7, wherein the step 1) is performed by manufacturing a coin-type half cell comprising a positive electrode of lithium thin film; a negative electrode of polymer; a separator and an electrolyte interposed between the lithium thin film and the polymer; and
   applying current of 0.5 mA to 1 mA to the coin-type half cell.

9. A lithium-metal secondary battery comprising a negative electrode of claim 1, a positive electrode, a separation membrane disposed between the negative electrode and the positive electrode, and an electrolyte.

10. The method of claim 7, wherein the polymer layer is formed of nylon.

* * * * *